US008549582B1

(12) United States Patent
Andrews et al.

(10) Patent No.: US 8,549,582 B1
(45) Date of Patent: Oct. 1, 2013

(54) METHODS FOR HANDLING A MULTI-PROTOCOL CONTENT NAME AND SYSTEMS THEREOF

(75) Inventors: Michael John Andrews, Stow, MA (US); Stephen Thomas Rust, Westborough, MA (US)

(73) Assignee: F5 Networks, Inc., Seattle, WA (US)

( * ) Notice: Subject to any disclaimer, the term of this patent is extended or adjusted under 35 U.S.C. 154(b) by 577 days.

(21) Appl. No.: 12/499,878

(22) Filed: Jul. 9, 2009

Related U.S. Application Data (60) Provisional application No. 61/080,075, filed on Jul. 11, 2008.

(51) Int. Cl.
| | |
|---|---|
| G06F 15/16 | (2006.01) |
| G06F 17/30 | (2006.01) |
| G06F 7/04 | (2006.01) |
| G06F 13/00 | (2006.01) |
| G06F 9/34 | (2006.01) |
| G06F 11/30 | (2006.01) |
| H04L 12/50 | (2006.01) |

(52) U.S. Cl.
USPC ............... 726/3; 726/26; 370/379; 713/193; 709/213; 711/114; 711/205

(58) Field of Classification Search
USPC ............... 713/1–2, 168–174, 182–186, 202; 726/2–8; 709/225, 229
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

"A Storage Architecture Guide," Second Edition, 2001, Auspex Systems, Inc., www.ausoex.com, last accessed on Dec. 30, 2002.

(Continued)

*Primary Examiner* — Evans Desrosiers
(74) *Attorney, Agent, or Firm* — LaClairRyan, a Professional Corporation (57) ABSTRACT

A method, computer readable medium, and system that handles a multi-protocol name in a virtualization environment includes determining and predicting with a virtualization management computing device when a name collision occurs between content names of different content accessible by two or more protocols. The virtualization management computing device restricts access to the different content in one or more network attached storage devices when the name collision is determined to occur to one or more of the protocols which can distinguish the different content. It preserves access to the different content in certain cases where the collision can be predicted.

15 Claims, 2 Drawing Sheets

(56) References Cited

U.S. PATENT DOCUMENTS

| | | |
|---|---|---|
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouirnet et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,699 B2 | 3/2006 | Zhang et al. |
| 7,024,424 B1 | 4/2006 | Platt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,128 B2 | 10/2006 | Banks et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,496 B2 | 1/2007 | Tanaka et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,236,491 B2 | 6/2007 | Tsao et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,343,398 B1 | 3/2008 | Lownsbrough |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |

| | | | | | |
|---|---|---|---|---|---|
| 7,467,158 B2 | 12/2008 | Marinescu | 2003/0149781 A1 | 8/2003 | Yared et al. |
| 7,475,241 B2 | 1/2009 | Patel et al. | 2003/0159072 A1 | 8/2003 | Bellinger et al. |
| 7,477,796 B2 | 1/2009 | Sasaki et al. | 2003/0171978 A1 | 9/2003 | Jenkins et al. |
| 7,509,322 B2 | 3/2009 | Miloushev et al. | 2003/0177364 A1 | 9/2003 | Walsh et al. |
| 7,512,673 B2 | 3/2009 | Miloushev et al. | 2003/0177388 A1 | 9/2003 | Botz et al. |
| 7,519,813 B1 | 4/2009 | Cox et al. | 2003/0200207 A1 | 10/2003 | Dickinson |
| 7,562,110 B2 | 7/2009 | Miloushev et al. | 2003/0204635 A1 | 10/2003 | Ko et al. |
| 7,571,168 B2 | 8/2009 | Bahar et al. | 2004/0003266 A1 | 1/2004 | Moshir et al. |
| 7,574,433 B2 | 8/2009 | Engel | 2004/0006575 A1 | 1/2004 | Visharam et al. |
| 7,587,471 B2 | 9/2009 | Yasuda et al. | 2004/0010654 A1 | 1/2004 | Yasuda et al. |
| 7,590,747 B2 | 9/2009 | Coates et al. | 2004/0017825 A1 | 1/2004 | Stanwood et al. |
| 7,599,941 B2 | 10/2009 | Bahar et al. | 2004/0025013 A1 | 2/2004 | Parker et al. |
| 7,610,307 B2 | 10/2009 | Havewala et al. | 2004/0028043 A1 | 2/2004 | Maveli et al. |
| 7,610,390 B2 | 10/2009 | Yared et al. | 2004/0028063 A1 | 2/2004 | Roy et al. |
| 7,624,109 B2 | 11/2009 | Testardi | 2004/0030857 A1 | 2/2004 | Krakirian et al. |
| 7,639,883 B2 | 12/2009 | Gill | 2004/0044705 A1 | 3/2004 | Stager et al. |
| 7,644,109 B2 | 1/2010 | Manley et al. | 2004/0054748 A1* | 3/2004 | Ackaouy et al. ............... 709/214 |
| 7,653,699 B1 | 1/2010 | Colgrove et al. | 2004/0054777 A1 | 3/2004 | Ackaouy et al. |
| 7,685,177 B1 | 3/2010 | Hagerstrom et al. | 2004/0098383 A1 | 5/2004 | Tabellion et al. |
| 7,689,596 B2 | 3/2010 | Tsunoda | 2004/0098595 A1 | 5/2004 | Aupperle et al. |
| 7,694,082 B2 | 4/2010 | Golding et al. | 2004/0133573 A1 | 7/2004 | Miloushev et al. |
| 7,711,771 B2 | 5/2010 | Kirnos | 2004/0133577 A1 | 7/2004 | Miloushev et al. |
| 7,734,603 B1 | 6/2010 | McManis | 2004/0133606 A1 | 7/2004 | Miloushev et al. |
| 7,743,035 B2 | 6/2010 | Chen et al. | 2004/0133607 A1 | 7/2004 | Miloushev et al. |
| 7,752,294 B2 | 7/2010 | Meyer et al. | 2004/0133652 A1 | 7/2004 | Miloushev et al. |
| 7,769,711 B2 | 8/2010 | Srinivasan et al. | 2004/0139355 A1 | 7/2004 | Axel et al. |
| 7,788,335 B2 | 8/2010 | Miloushev et al. | 2004/0148380 A1 | 7/2004 | Meyer et al. |
| 7,809,691 B1 | 10/2010 | Karmarkar et al. | 2004/0153479 A1 | 8/2004 | Mikesell et al. |
| 7,818,299 B1 | 10/2010 | Federwisch et al. | 2004/0181605 A1 | 9/2004 | Nakatani et al. |
| 7,822,939 B1 | 10/2010 | Veprinsky et al. | 2004/0199547 A1* | 10/2004 | Winter et al. .................. 707/200 |
| 7,831,639 B1 | 11/2010 | Panchbudhe et al. | 2004/0213156 A1 | 10/2004 | Smallwood et al. |
| 7,849,112 B2 | 12/2010 | Mane et al. | 2004/0236798 A1 | 11/2004 | Srinivasan et al. |
| 7,870,154 B2 | 1/2011 | Shitomi et al. | 2005/0021615 A1 | 1/2005 | Arnott et al. |
| 7,877,511 B1 | 1/2011 | Berger et al. | 2005/0050107 A1 | 3/2005 | Mane et al. |
| 7,885,970 B2 | 2/2011 | Lacapra | 2005/0091214 A1 | 4/2005 | Probert et al. |
| 7,904,466 B1 | 3/2011 | Valencia et al. | 2005/0108575 A1 | 5/2005 | Yung |
| 7,913,053 B1 | 3/2011 | Newland | 2005/0114291 A1 | 5/2005 | Becker-Szendy et al. |
| 7,953,701 B2 | 5/2011 | Okitsu et al. | 2005/0114701 A1 | 5/2005 | Atkins et al. |
| 7,958,347 B1 | 6/2011 | Ferguson | 2005/0117589 A1 | 6/2005 | Douady et al. |
| 8,005,953 B2 | 8/2011 | Miloushev et al. | 2005/0160161 A1 | 7/2005 | Barrett et al. |
| 8,046,547 B1 | 10/2011 | Chatterjee et al. | 2005/0175013 A1 | 8/2005 | Le Pennec et al. |
| 8,103,622 B1 | 1/2012 | Karinta | 2005/0187866 A1 | 8/2005 | Lee |
| 8,112,392 B1 | 2/2012 | Bunnell et al. | 2005/0189501 A1 | 9/2005 | Sato et al. |
| 8,271,751 B2 | 9/2012 | Hinrichs, Jr. | 2005/0213587 A1 | 9/2005 | Cho et al. |
| 8,326,798 B1 | 12/2012 | Driscoll et al. | 2005/0246393 A1 | 11/2005 | Coates et al. |
| 8,351,600 B2 | 1/2013 | Resch | 2005/0289109 A1 | 12/2005 | Arrouye et al. |
| 2001/0007560 A1 | 7/2001 | Masuda et al. | 2005/0289111 A1 | 12/2005 | Tribble et al. |
| 2001/0014891 A1 | 8/2001 | Hoffert et al. | 2006/0010502 A1* | 1/2006 | Mimatsu et al. ................. 726/27 |
| 2001/0047293 A1 | 11/2001 | Waller et al. | 2006/0045096 A1 | 3/2006 | Farmer et al. |
| 2001/0051955 A1 | 12/2001 | Wong | 2006/0074922 A1* | 4/2006 | Nishimura .................... 707/100 |
| 2002/0035537 A1 | 3/2002 | Waller et al. | 2006/0075475 A1 | 4/2006 | Boulos et al. |
| 2002/0059263 A1 | 5/2002 | Shima et al. | 2006/0080353 A1 | 4/2006 | Miloushev et al. |
| 2002/0065810 A1 | 5/2002 | Bradley | 2006/0106882 A1 | 5/2006 | Douceur et al. |
| 2002/0073105 A1 | 6/2002 | Noguchi et al. | 2006/0112151 A1 | 5/2006 | Manley et al. |
| 2002/0083118 A1 | 6/2002 | Sim | 2006/0123062 A1 | 6/2006 | Bobbitt et al. |
| 2002/0087887 A1 | 7/2002 | Busam et al. | 2006/0140193 A1 | 6/2006 | Kakani et al. |
| 2002/0106263 A1 | 8/2002 | Winker | 2006/0153201 A1 | 7/2006 | Hepper et al. |
| 2002/0120763 A1 | 8/2002 | Miloushev et al. | 2006/0161518 A1 | 7/2006 | Lacapra |
| 2002/0133330 A1 | 9/2002 | Loisey et al. | 2006/0167838 A1 | 7/2006 | Lacapra |
| 2002/0133491 A1 | 9/2002 | Sim et al. | 2006/0184589 A1 | 8/2006 | Lees et al. |
| 2002/0138502 A1 | 9/2002 | Gupta | 2006/0190496 A1 | 8/2006 | Tsunoda |
| 2002/0143909 A1 | 10/2002 | Botz et al. | 2006/0200470 A1 | 9/2006 | Lacapra et al. |
| 2002/0147630 A1 | 10/2002 | Rose et al. | 2006/0206547 A1 | 9/2006 | Kulkarni et al. |
| 2002/0150253 A1 | 10/2002 | Brezak et al. | 2006/0212746 A1 | 9/2006 | Amegadzie et al. |
| 2002/0156905 A1 | 10/2002 | Weissman | 2006/0218135 A1 | 9/2006 | Bisson et al. |
| 2002/0160161 A1 | 10/2002 | Misuda | 2006/0224636 A1 | 10/2006 | Kathuria et al. |
| 2002/0161911 A1 | 10/2002 | Pinckney, III et al. | 2006/0224687 A1 | 10/2006 | Popkin et al. |
| 2002/0188667 A1 | 12/2002 | Kirnos | 2006/0230265 A1 | 10/2006 | Krishna |
| 2002/0194342 A1 | 12/2002 | Lu et al. | 2006/0259949 A1 | 11/2006 | Schaefer et al. |
| 2003/0009429 A1 | 1/2003 | Jameson | 2006/0268692 A1 | 11/2006 | Wright et al. |
| 2003/0012382 A1 | 1/2003 | Ferchichi et al. | 2006/0271598 A1 | 11/2006 | Wong et al. |
| 2003/0028514 A1 | 2/2003 | Lord et al. | 2006/0277225 A1 | 12/2006 | Mark et al. |
| 2003/0033308 A1 | 2/2003 | Patel et al. | 2006/0282461 A1 | 12/2006 | Marinescu |
| 2003/0033535 A1 | 2/2003 | Fisher et al. | 2006/0282471 A1 | 12/2006 | Mark et al. |
| 2003/0061240 A1 | 3/2003 | McCann et al. | 2007/0024919 A1 | 2/2007 | Wong et al. |
| 2003/0065956 A1 | 4/2003 | Belapurkar et al. | 2007/0027929 A1 | 2/2007 | Whelan |
| 2003/0115218 A1 | 6/2003 | Bobbitt et al. | 2007/0028068 A1 | 2/2007 | Golding et al. |
| 2003/0115439 A1 | 6/2003 | Mahalingam et al. | 2007/0088702 A1 | 4/2007 | Fridella et al. |
| 2003/0135514 A1 | 7/2003 | Patel et al. | 2007/0136308 A1 | 6/2007 | Tsirigotis et al. |

| | | | |
|---|---|---|---|
| 2007/0139227 | A1 | 6/2007 | Speirs, II et al. |
| 2007/0180314 | A1 | 8/2007 | Kawashima et al. |
| 2007/0208748 | A1 | 9/2007 | Li |
| 2007/0209075 | A1 | 9/2007 | Coffman |
| 2007/0226331 | A1 | 9/2007 | Srinivasan et al. |
| 2008/0070575 | A1 | 3/2008 | Claussen et al. |
| 2008/0104443 | A1 | 5/2008 | Akutsu et al. |
| 2008/0114718 | A1 | 5/2008 | Anderson et al. |
| 2008/0189468 | A1 | 8/2008 | Schmidt et al. |
| 2008/0200207 | A1 | 8/2008 | Donahue et al. |
| 2008/0209073 | A1 | 8/2008 | Tang |
| 2008/0215836 | A1 | 9/2008 | Sutoh et al. |
| 2008/0222223 | A1 | 9/2008 | Srinivasan et al. |
| 2008/0243769 | A1 | 10/2008 | Arbour et al. |
| 2008/0282047 | A1 | 11/2008 | Arakawa et al. |
| 2008/0294446 | A1 | 11/2008 | Guo et al. |
| 2009/0007162 | A1 | 1/2009 | Sheehan |
| 2009/0013138 | A1 | 1/2009 | Sudhakar |
| 2009/0037975 | A1* | 2/2009 | Ishikawa et al. ............. 726/1 |
| 2009/0041230 | A1 | 2/2009 | Williams |
| 2009/0055507 | A1 | 2/2009 | Oeda |
| 2009/0077097 | A1 | 3/2009 | Lacapra et al. |
| 2009/0089344 | A1* | 4/2009 | Brown et al. ............ 707/205 |
| 2009/0094252 | A1 | 4/2009 | Wong et al. |
| 2009/0106255 | A1 | 4/2009 | Lacapra et al. |
| 2009/0106263 | A1 | 4/2009 | Khalid et al. |
| 2009/0132616 | A1 | 5/2009 | Winter et al. |
| 2009/0204649 | A1 | 8/2009 | Wong et al. |
| 2009/0204650 | A1 | 8/2009 | Wong et al. |
| 2009/0204705 | A1 | 8/2009 | Marinov et al. |
| 2009/0210431 | A1 | 8/2009 | Marinkovic et al. |
| 2009/0210875 | A1 | 8/2009 | Bolles et al. |
| 2009/0240705 | A1 | 9/2009 | Miloushev et al. |
| 2009/0240899 | A1 | 9/2009 | Akagawa et al. |
| 2009/0254592 | A1 | 10/2009 | Marinov et al. |
| 2009/0265396 | A1 | 10/2009 | Ram et al. |
| 2010/0017643 | A1 | 1/2010 | Baba et al. |
| 2010/0082542 | A1 | 4/2010 | Feng et al. |
| 2010/0205206 | A1 | 8/2010 | Rabines et al. |
| 2010/0325634 | A1 | 12/2010 | Ichikawa et al. |
| 2011/0083185 | A1 | 4/2011 | Sheleheda et al. |
| 2011/0087696 | A1 | 4/2011 | Lacapra |
| 2011/0093471 | A1 | 4/2011 | Brockway et al. |
| 2011/0107112 | A1 | 5/2011 | Resch |
| 2011/0119234 | A1 | 5/2011 | Schack et al. |
| 2011/0320882 | A1 | 12/2011 | Beaty et al. |
| 2012/0144229 | A1 | 6/2012 | Nadolski |
| 2012/0150699 | A1 | 6/2012 | Trapp et al. |

FOREIGN PATENT DOCUMENTS

| | | | |
|---|---|---|---|
| CA | 2512312 A1 | 7/2004 | |
| EP | 0605088 A3 | 2/1996 | |
| EP | 0 738 970 A | 10/1996 | |
| JP | 63010250 A | 1/1988 | |
| JP | 6205006 A | 7/1994 | |
| JP | 6-332782 A | 12/1994 | |
| JP | 8021924 B | 3/1996 | |
| JP | 08-328760 A | 12/1996 | |
| JP | 08-339355 | 12/1996 | |
| JP | 9016510 A | 1/1997 | |
| JP | 11282741 A1 | 10/1999 | |
| JP | 2000-183935 | 6/2000 | |
| NZ | 566291 A | 12/2008 | |
| WO | 02/39696 A2 | 5/2002 | |
| WO | WO 02/056181 A3 | 7/2002 | |
| WO | WO 2004/061605 A2 | 7/2004 | |
| WO | 2006091040 A1 | 8/2006 | |
| WO | WO 2008/130983 A1 | 10/2008 | |
| WO | WO 2008/147973 A2 | 12/2008 | |

OTHER PUBLICATIONS

"CSA Persistent File System Technology, Colorado Software" Architecture, Inc. White Paper,Jan. 1999, p. 1-3.
"Distributed File System: A Logical View of Physical Storage : White Paper," 1999, Microsoft Corp., www.microsoft.com, last accessed on Dec. 20, 2002.
"How DFS Works: Remote File Systems," Distributed File System (DFS) Technical Reference, retrieved from the Internet on Feb. 13, 2009: URL:http://technetmicrosoft.com/en-us/library/cc782417.aspx>(2003).
"NERSC Tutorials: I/O on the Cray T3E," chapter 8, "Disk Striping," National Energy Research Scientific Computing Center (NERSC), http://hpcf.nersc.gov, last accessed on Dec. 27, 2002.
"Scaling Next Generation Web Infrastructure with Content-Intelligent Switching : White Paper," Apr. 2000, Alteon WebSystems, Inc., (now Nortel Networks).
"The AFS File System in Distributed Computing Environment," May 1996, Transarc Corp., www.transarc.ibm.com, last accessed on Dec. 20, 2002.
"VERITAS SANPoint Foundation Suite(tm) and SANPoint Foundation(trn) Suite HA: New VERTIAS Volume Management and File System Technology for Cluster Environments," Sep. 2001, VERITAS Software Corp.
"Windows Clustering Technologies—An Overview," Nov. 2000, Microsoft Corp., www.microsoft.com, last accessed on Dec. 30, 2002.
Aguilera et al., "Improving recoverability in multi-tier storage systems," International Conference on Dependable Systems and Networks (DSN-2007), Edinburgh, Scotland, Jun. 2007, 10 pages.
Anderson et al., "Serverless Network File System," in the 15th Symposium on Operating Systems Principles, Dec. 1995, Association for Computing Machinery, Inc.
Anderson, Darrell C. et al., "Interposed Request Routing for Scalable Network Storage," ACM Transactions on Computer Systems 20(1):1-24 (Feb. 2002).
Apple, Inc. "Mac OS X Tiger Keynote Intro. Part 2" Jun. 2004, www.youtube.com <http://www.youtube.com/watch?v=zSBJwEmRJbY>, p. 1-2.
Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pp. 1-6.
Cabrera et al., "Swift: A Storage Architecture for Large Objects," Proceedings of the Eleventh IEEE Symposium on Mass Storage Systems, pp. 123-428, Oct. 1991.
Cabrera et al., "Swift: Using Distributed Disk Striping to Provide High I/O Data Rates," Computing Systems 4, 4 (Fall 1991), pp. 405-436.
Cabrera et al, "Using Data Striping in a Local Area Network," 1992, technical report No. UCSC-CRL-92-09 of the Computer & Information Sciences Department of University of California at Santa Cruz.
Callaghan et al., "NFS Version 3 Protocol Spcification," (RFC 1813), 1995, The Internet Engineering Task Force (IETF), www.ietf.org, last accessed on Dec. 30, 2002.
Carns et al., "PVFS: A Parallel File System for Linux Clusters," Proceedings of the 4th Annual Linux Showcase and Conference, pp. 317-327, Atlanta, Georgia, Oct. 2000, USENIX Association.
Cavale, M. R., "Introducing Microsoft Cluster Service (MSCS) in the Windows Server 2003," Microsoft Corporation, Nov. 2002.
English Translation of Notification of Reason(s) for Refusal for JP 2002-556371 (Dispatch Date: Jan. 22, 2007).
Export Personal Folders from Outlook Folders Folder List, http://helpdesk.ua.edu/training/outlook/folders.html (Aug. 6, 2009)
Fan, et al., Summary Cache: A Scalable Wide-Area Web Cache Sharing Protocol, Computer Communications Review, Association for Computing Machinery, New York, USA 28(4):254-265 (1998).
Book Review by Farley, "Building Storage Networks," Jan. 2000, McGraw-Hill, ISBN 0072120509.
Gibson et al., "File Server Scaling with Network-Attached Secure Disks," in Proceedings of the ACM International Conference on Measurement and Modeling of Computer Systems (Sigmetrics '97), 1997, Association for Computing Machinery, Inc.
Gibson et al., "NASD Scalable Storage Systems," Jun. 1999, USENIX99, Extreme Linux Workshop, Monterey, California.
Hartman, "The Zebra Striped Network File System," 1994, Ph.D. dissertation submitted in the Graduate Division of the University of California at Berkeley.
Haskin et al., "The Tiger Shark File System," 1995, in proceedings of IEEE, Spring COMPCON, Santa Clara, CA, www.research.ibm.com, last accessed on Dec. 30, 2002.

Hwang et al., Designing SSI Clusters with Hierarchical Checkpointing and Single I/O Space, IEEE Concurrency, pp. 60-69, Jan.-Mar. 1999.
International Search Report for International Patent Application No. PCT/US03/41202 (Sep. 15, 2005).
International Search Report for International Patent Application No. PCT/US02/00720 (Jul. 8, 2004).
International Search Report for International Patent Application No. PCT/US2008/064677 (Sep. 6, 2009).
International Search Report for International Patent Application No. PCT/US2008/060449 (Apr. 9, 2008).
International Search Report for International Patent Application No. PCT/US2008/083117 (Jun. 23, 2009).
Karamanolis et al., "An Architecture for Scalable and Manageable File Services," HPL-2001-173 p. 1-14 (Jul. 26, 2001).
Katsurashima et al., "NAS Switch: A Novel CIFS Server Virtualization," Proceedings. 20th IEEE/11th NASA Goddard Conference on Mass Storage Systems and Technologies, 2003 (MSST 2003), Apr. 2003.
Kimball, C.E. et al., Automated Client-Side Integration of Distributed Application Servers, 13th LISA Conf., 1999. (no month, day).
Kohl et al., "The Kerberos Network Authentication Service (V5)," RFC 1510, Sep. 1993. (http://www.ietf.org/rfc/rfc1510.txt?number=1510.
Long et al., "Swift/RAID: A distributed RAID system," Computing Systems, vol. 7, pp. 333-359, Summer 1994.
Noghani et al., A Novel Approach to reduce Latency on the Internet: 'Component-Based Download', Proceedings of the Int'l Conf. on Internet Computing, Las Vegas, NV pp. 1-6 (2000).
Norton et al., "CIFS Protocol Version CIFS-Spec 0.9," 2001, Storage Networking Industry Association (SNIA), www.snia.org, last accessed on Mar. 26, 2001.
Patterson et al., "A case for redundant arrays of inexpensive disks (RAID)," Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2012.
Pearson, P.K., "Fast Hashing of Variable-Length Text Strings," Comm. of the ACM, vol. 33, No. 6, Jun. 1990.
Peterson, "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, www.usenix.org, last accessed on Dec. 20, 2002.
Rodriguez et al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph-p. 868, col. 1, paragraph 1.
Savage, et al., "AFRAID—A Frequently Redundant Array of Inexpensive Disks," 1996 USENIX Technical Conf., San Diego, California, Jan. 22-26, 1996.
Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).
Sorenson, K.M., "Installation and Administration: Kimberlite Cluster Version 1.1.0, Rev. D." Mission Critical Linux, (no year, month, day) http://oss.missioncriticallinux.com/kimberlite/kimberlite.pdf.
Stakutis, "Benefits of SAN-based file system sharing," Jul. 2000, InfoStor, www.infostor.com, last accessed on Dec. 30, 2002.
Thekkath et al., "Frangipani: A Scalable Distributed File System," in Proceedings of the 16th ACM Symposium on Operating Systems Principles, Oct. 1997, Association for Computing Machinery, Inc.
Wilkes, J., et al., "The HP AutoRAID Hierarchical Storage System," *ACM Transactions on Computer Systems* 14(1):1-29 (Feb. 1996).
Zayas, "AFS-3 Programmer's Reference: Architectural Overview," Transarc Corp., version 1.0 of Sep. 2, 1991, doc. No. FS-00-D160.
Rsync, "Welcome to the RSYNC Web Pages," Retrieved from the Internet URL: http://samba.anu.edu.au/rsync/ pp. 1-5 (Retrieved on Dec. 18, 2009).

Basney et al., "Credential Wallets: A Classification of Credential Repositories Highlighting MyProxy," TPRC 2003, Sep. 19-21, 2003, pp. 1-20.
Botzum, Keys, "Single Sign On—A Contrarian View," Open Group Website, <http://www.opengroup.org/security/topics.htm>, Aug. 6, 2001, pp. 1-8.
Harrison, C., May 19, 2008 response to Communication pursuant to Article 96(2) EPC dated Nov. 9, 2007 in corresponding European patent application No. 02718824.2.
Hu, J., Final Office action dated Sep. 21, 2007 for related U.S. Appl. No. 10/336,784.
Hu, J., Office action dated Feb. 6, 2007 for related U.S. Appl. No. 10/336,784.
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects," Feb. 25, 2011, pp. 1-3, last accessed Mar. 17, 2011, <http://searchstorage.techtarget.com/news/article/0,289142,sid5_gci1527986,00.html>.
Novotny et al., "An Online Credential Repository for the Grid: MyProxy," 2001, pp. 1-8.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004, Royal Holloway, University of London.
Response filed Jul. 6, 2007 to Office action dated Feb. 6, 2007 for related U.S. Appl. No. 10/336,784.
Response filed Mar. 20, 2008 to Final Office action dated Sep. 21,2007 for related U.S. Appl. No. 10/336,784.
Soltis et al., "The Global File System," Sep. 17-19, 1996, in Proceedings of the Fifth NASA Goddard Space Flight Center Conference on Mass Storage Systems and Technologies, College Park, Maryland.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May, 26, 2008 in corresponding Japanese patent application No. 2002-556371.
Uesugi, H., English translation of office action dated May, 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
Gupta et al., "Algorithms for Packet Classification", Computer Systems Laboratory, Stanford University, CA, Mar./Apr. 2001, pp. 1-29.
Heinz II G., "Priorities in Stream Transmission Control Protocol (SCTP) Multistreaming", Thesis submitted to the Faculty of the University of Delaware, Spring 2003, pp. 1-35.
Internet Protocol, "DARPA Internet Program Protocol Specification", (RFC:791), Information Sciences Institute, University of Southern California, Sep. 1981, pp. 1-49.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Modiano E., "Scheduling Algorithms for Message Transmission Over a Satellite Broadcast System," MIT Lincoln Laboratory Advanced Network Group, Nov. 1997, pp. 1-7.
Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietf.org/rfc/rfc3032.txt).

Wang B., "Priority and Realtime Data Transfer Over the Best-Effort Internet", Dissertation Abstract, Sep. 2005, ScholarWorks@UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR HANDLING A MULTI-PROTOCOL CONTENT NAME AND SYSTEMS THEREOF

This application claims the benefit of U.S. Provisional Patent Application Ser. No. 61/080,075, filed Jul. 11, 2008 which is hereby incorporated by reference in its entirety.

FIELD OF THE INVENTION

This invention generally relates to methods and systems for content virtualization and, more particularly to methods for handling a multi-protocol content name in a virtualization environment and systems thereof.

BACKGROUND

Often content, such as files and directories, in computer systems are remotely stored on one or more data storage devices. Multiple protocols, such as NFS and CIFS protocols, are used by these computer systems to access this content stored on these data storage devices.

Virtualization devices manage and present content stored on a plurality of data storage devices as a single, unified file system. Basically, these virtualization devices decouple the presentation of content from the actual physical location of the content to provide a single unified file system. Additionally, these virtualization devices rely on the ability to migrate data between different data storage devices as appropriate and desired for the particular application.

Unfortunately, this multi-protocol mode which these virtualization devices accommodate presents a number of challenges. More specifically, the CIFS protocol is unable to represent many NFS filenames. For example, certain characters, such as the colon ":" can not be used in CIFS names. As a result, virtualization devices can not produce a file generated name for some NFS filenames.

Additionally, CIFS typically is incapable of representing two files with names that differ only in their capitalization. When an NFS device creates a name that can not be represented in CIFS, the data storage system creates a special CIFS name for the file. Unfortunately, these filer-generated names (FGN) can match an already existing name of a file or directory resulting in a collision. If this occurs, when the virtualization device moves the content, such as a file or directory, between data storage devices, the content can be overwritten and lost.

SUMMARY

A method for handling a multi-protocol name in a virtualization environment includes determining with a virtualization management computing device when a name collision occurs between content names of different content accessible by two or more protocols. The virtualization management computing device restricts access to the different content in one or more network attached storage devices when the name collision is determined to occur to one or more of the protocols which can distinguish the different content.

A computer readable medium having stored thereon instructions for methods for handling a multi-protocol content name in a virtualization environment comprising machine executable code which when executed by at least one processor, causes the processor to perform steps including determining when a name collision occurs between content names of different content accessible by two or more protocols. Access to the different content is restricted when the name collision is determined to occur to one or more of the protocols which can distinguish the different content.

A multi-protocol name handling system includes a collision determination system and a traffic management system. The collision determination system determines when a name collision occurs between content names of different content accessible by two or more protocols. The traffic management system restricts access to the different content in one or more network attached storage devices when the name collision is determined to occur to one or more of the protocols which can distinguish the different content.

Accordingly, as illustrated and described herein the present invention provides a more effective method and system for handling a multi-protocol content name in a virtualization environment. With the present invention, potential collisions between similar content names in different shares can be identified and remedial action can be taken. The present invention helps to avoid the accidental overwrite or other loss of content, such as a file or a directory, in a virtualization environment.

DETAILED DESCRIPTION

Figure 1:
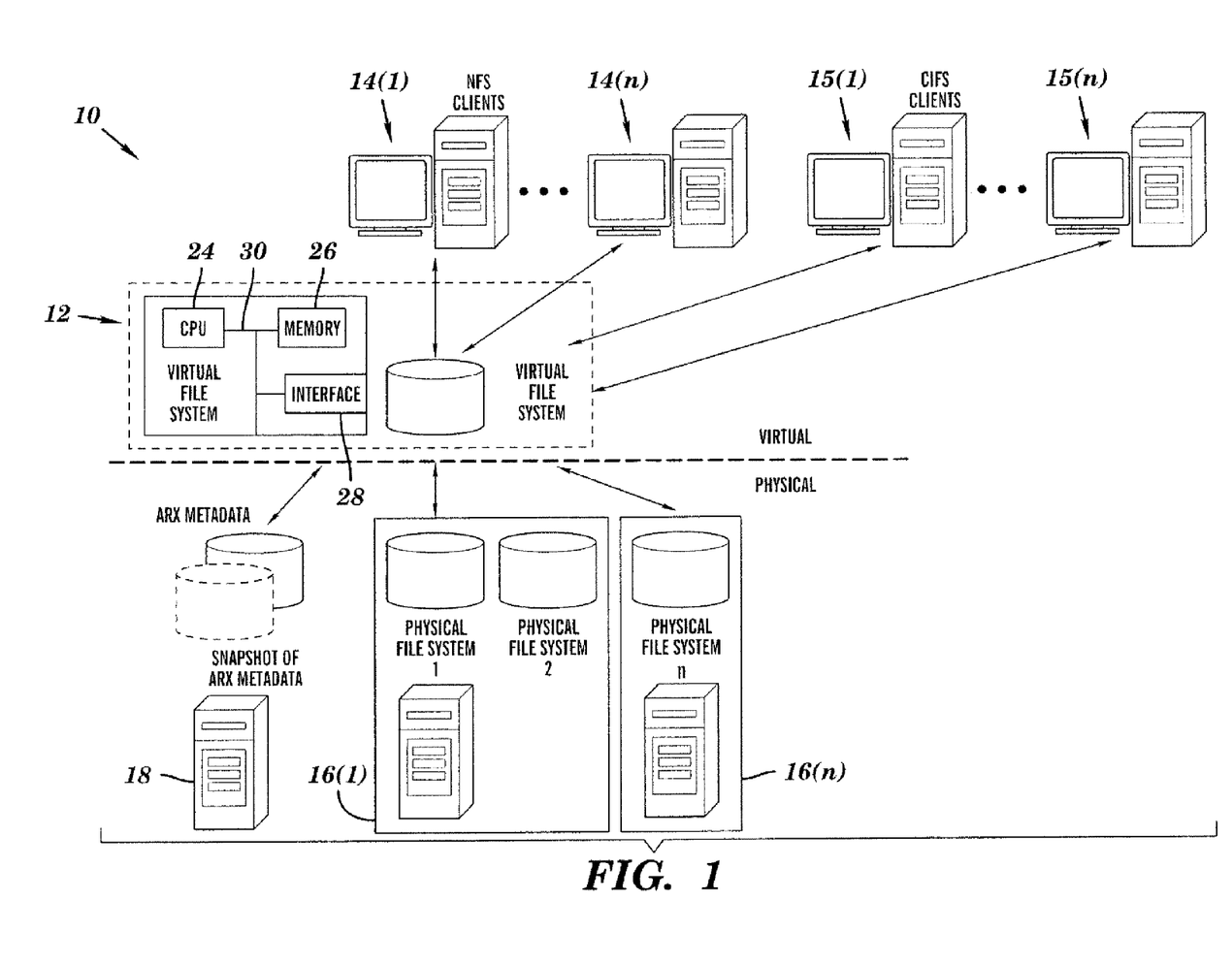
FIG. 1 is a partial block diagram and partial functional diagram of a system in which a multi-protocol content name is handled in a file virtualization environment.

A system 10 in which a multi-protocol content name is handled in a file virtualization environment is illustrated in FIG. 1. This system 10 includes a virtualization management computing device 12, a plurality of client computing devices 14(1)-14(n) utilizing an NFS protocol, a plurality of client computing devices 15(1)-15(n) utilizing a CIFS protocol, data storage devices 16(1)-16(n), a metadata filer system 18 which are all coupled together by one or more communication networks, although this system can include other numbers and types of systems, devices, components, and elements in other configurations. The present invention provides a number of advantages including providing more effective methods and system for handling a multi-protocol content name in a virtualization environment.

The virtualization management computing device 12 tracks content, such as files and directories, and manages multi-protocol content name handling in a virtualization environment, although other numbers and types of systems can be used and other numbers and types of functions can be performed. The virtualization management computing device 12 includes a central processing unit (CPU) or processor 24, a memory 26, and an interface system 28 which are coupled together by a bus 30 or other link, although other numbers and types of systems, devices, components, and elements in other configurations and locations can be used. The processor 24 in the virtualization management computing device 12 executes a program of stored instructions for one or more aspects of the present invention as described and illustrated by way of the embodiments herein, such as handling a multi-protocol content name in a virtualization environment, although other types and numbers of processing devices could be used and the processor could execute other numbers and types of programmed instructions.

The memory 26 in the virtualization management computing device 12 stores these programmed instructions for one or more aspects of the present invention as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to processor 24, can be used for the memory in the virtualization management computing device 12.

The interface system 28 in the virtualization management computing device 12 is used to operatively couple and communicate between the virtualization management computing device 12 and the client computing devices 14(1)-14(n), the client computing devices 15(1)-15(n), the data storage devices 16(1)-16(n), and the metadata filer system 18 via one or more the communications networks, although other types and numbers of communication networks or systems with other types and numbers of connections and configurations can be used. By way of example only, the one or more the communications networks can use TCP/IP over Ethernet and industry-standard protocols, including NFS, CIFS, SOAP, XML, LDAP, and SNMP, although other types and numbers of communication networks, such as a direct connection, a local area network, a wide area network, modems and phone lines, e-mail, and wireless communication technology, each having their own communications protocols, can be used.

Each of the client computing devices 14(1)-14(n) utilizes the virtualization management computing device 12 and the NFS protocol to conduct one or more operations with one or more of the data storage systems 16(1)-16(n) and the metadata filer system 18, such as to store a file or directory, delete a file or directory, and create a file or directory by way of example only, although other numbers and types of systems could be utilizing these resources and other types and numbers of functions utilizing other types of protocols could be performed. Each of the client computing devices 14(1)-14(n) includes a central processing unit (CPU) or processor, a memory, user input device, a display, and an interface system, and which are coupled together by a bus or other link, although each of the client computing devices 14(1)-14(n) can include other numbers and types of components, parts, devices, systems, and elements in other configurations. The processor in each of the client computing devices 14(1)-14(n) executes a program of stored instructions for one or more aspects of the present invention as described and illustrated herein, although the processor could execute other numbers and types of programmed instructions.

The memory in the each of the client computing devices 14(1)-14(n) stores these programmed instructions for one or more aspects of the present invention as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, or other computer readable medium which is read from and written to by a magnetic, optical, or other reading and writing system that is coupled to one or more processors, can be used for the memory in each of the client computing devices 14(1)-14(n).

The user input device in each of the client computing devices 14(1)-14(n) is used to input selections, such as to store a file or directory, delete a file or directory, and create a file or directory, although the user input device could be used to input other types of data and interact with other elements. The user input device can include a computer keyboard and a computer mouse, although other types and numbers of user input devices can be used. The display in each of the client computing devices 14(1)-14(n) is used to display information, such as the retrieved prior file or directory, although other types and amounts of information can be displayed in other manners. The display can include a computer display screen, such as a CRT or LCD screen, although other types and numbers of displays could be used.

The interface system in each of the client computing devices 14(1)-14(n) is used to operatively couple and communicate between the client computing devices 14(1)-14(n) and the virtualization management computing device 12, the client computing devices 15(1)-15(n), the data storage devices 16(1)-16(n), the metadata filer system 18 via the one or more communications networks, although other types and numbers of communication networks or systems with other types and numbers of configurations and connections to other systems and devices can be used.

Each of the client computing devices 15(1)-15(n) utilizes the virtualization management computing device 12 and the CIFS protocol to conduct one or more operations with one or more of the data storage systems 16(1)-16(n) and the metadata filer system 18, such as to store a file or directory, delete a file or directory, and create a file or directory by way of example only, although other numbers and types of systems could be utilizing these resources and other types and numbers of functions utilizing other types of protocols could be performed. Each of the client computing devices 15(1)-15(n) includes a central processing unit (CPU) or processor, a memory, user input device, a display, and an interface system, and which are coupled together by a bus or other link, although each of the client computing devices 15(1)-15(n) can include other numbers and types of components, parts, devices, systems, and elements in other configurations. The processor in each of the client computing devices 15(1)-15(n) executes a program of stored instructions for one or more aspects of the present invention as described and illustrated herein, although the processor could execute other numbers and types of programmed instructions.

The memory in the each of the client computing devices 15(1)-15(n) stores these programmed instructions for one or more aspects of the present invention as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, or other computer readable medium which is read from and written to by a magnetic, optical, or other reading and writing system that is coupled to one or more processors, can be used for the memory in each of the client computing devices 15(1)-15(n).

The user input device in each of the client computing devices 15(1)-15(n) is used to input selections, such as to store a file or directory, delete a file or directory, and create a file or directory, although the user input device could be used to input other types of data and interact with other elements. The user input device can include a computer keyboard and a computer mouse, although other types and numbers of user input devices can be used. The display in each of the client computing devices 15(1)-15(n) is used to display information, such as the retrieved prior file or directory, although other types and amounts of information can be displayed in other manners. The display can include a computer display screen, such as a CRT or LCD screen, although other types and numbers of displays could be used.

The interface system in each of the client computing devices 15(1)-15(n) is used to operatively couple and communicate between the client computing devices 15(1)-15(n) and the virtualization management computing device 12, the client computing devices 14(1)-14(n), the data storage devices 16(1)-16(n), the metadata filer system 18 via the one or more communications networks, although other types and numbers of communication networks or systems with other types and numbers of configurations and connections to other systems and devices can be used.

Each of the data storage devices 16(1)-16(n) stores content, such as files and directories, and other data in multiple protocols, although other numbers and types of storage systems which could have other numbers and types of functions and store other data could be used. In this particular example, data storage device 16(1) comprises a single data storage device with two physical file systems and data storage device 16(n) comprises a single data storage device with a single physical file system, although one or more of the data storage devices 16(1)-16(n) could have other numbers of physical file systems or all could have the same number of physical file systems. Each physical file system has its own catalog of data backups.

Each of the data storage devices 16(1)-16(n) include a central processing unit (CPU) or processor, a memory, and an interface system which are coupled together by a bus or other link, although other numbers and types systems, devices, components, and elements in other configurations can be used. By way of example only, the storage systems may not have their own separate processing capabilities. In this example, the specialized processor in each of the data storage devices 16(1)-16(n) executes a program of stored instructions for one or more aspects of the present invention as described and illustrated by way of the embodiments herein, although the processor in each of the data storage devices 16(1)-16(n) could execute other numbers and types of programmed instructions.

The memory in each of the data storage devices 16(1)-16(n) store these programmed instructions for one or more aspects of the present invention as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to one or more processors in each of the data storage devices 16(1)-16(n), can be used for the memory in each of the data storage devices 16(1)-16(n).

The interface system in each of the data storage devices 16(1)-16(n) are each used to operatively couple and communicate between each of the data storage devices 16(1)-16(n) and the virtualization management computing device 12, the client computing devices 14(1)-14(n), the client computing devices 15(1)-15(n), and the metadata filer system 18 via one or more the communications networks, although other types and numbers of communication networks or systems with other types and numbers of configurations and connections to other systems and devices can be used.

The metadata filer system 18 is another type of storage device to store and manage metadata relating to a location of content, such as a file or a directory, for the virtualization management computing device 12, although other numbers and types of storage systems which could have other numbers and types of functions and could store other data could be used. The metadata filer system 18 includes a central processing unit (CPU) or processor, a memory, and an interface system which are coupled together by a bus or other link, although other numbers and types of components, parts, devices, systems, and elements in other configurations can be used for the storage system. By way of example only, the metadata filer system 18 may not have its own separate processing capabilities. In this example, the specialized processor in the metadata filer system 18 executes a program of stored instructions for one or more aspects of the present invention as described and illustrated by way of the embodiments herein, although the processor in the metadata filer system could execute other numbers and types of programmed instructions.

The memory in the metadata filer system 18 stores these programmed instructions for one or more aspects of the present invention as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor in the metadata filer system 18, can be used for the memory in the metadata filer system 18.

The interface system in the metadata filer system 18 is used to operatively couple and communicate between the metadata filer system 18 and the virtualization management computing device 12, the client computing devices 14(1)-14(n), the client computing devices 15(1)-15(n), and the data storage devices 16(1)-16(n) via the one or more communications networks, although other types and numbers of communication networks or systems with other types and numbers of configurations and connections to other systems and devices can be used.

Although embodiments of the virtualization management computing device 12, the plurality of client computing devices 14(1)-14(n), the client computing devices 15(1)-15(n), the data storage devices 16(1)-16(n), and the metadata filer system 18 are described herein, each of these systems can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
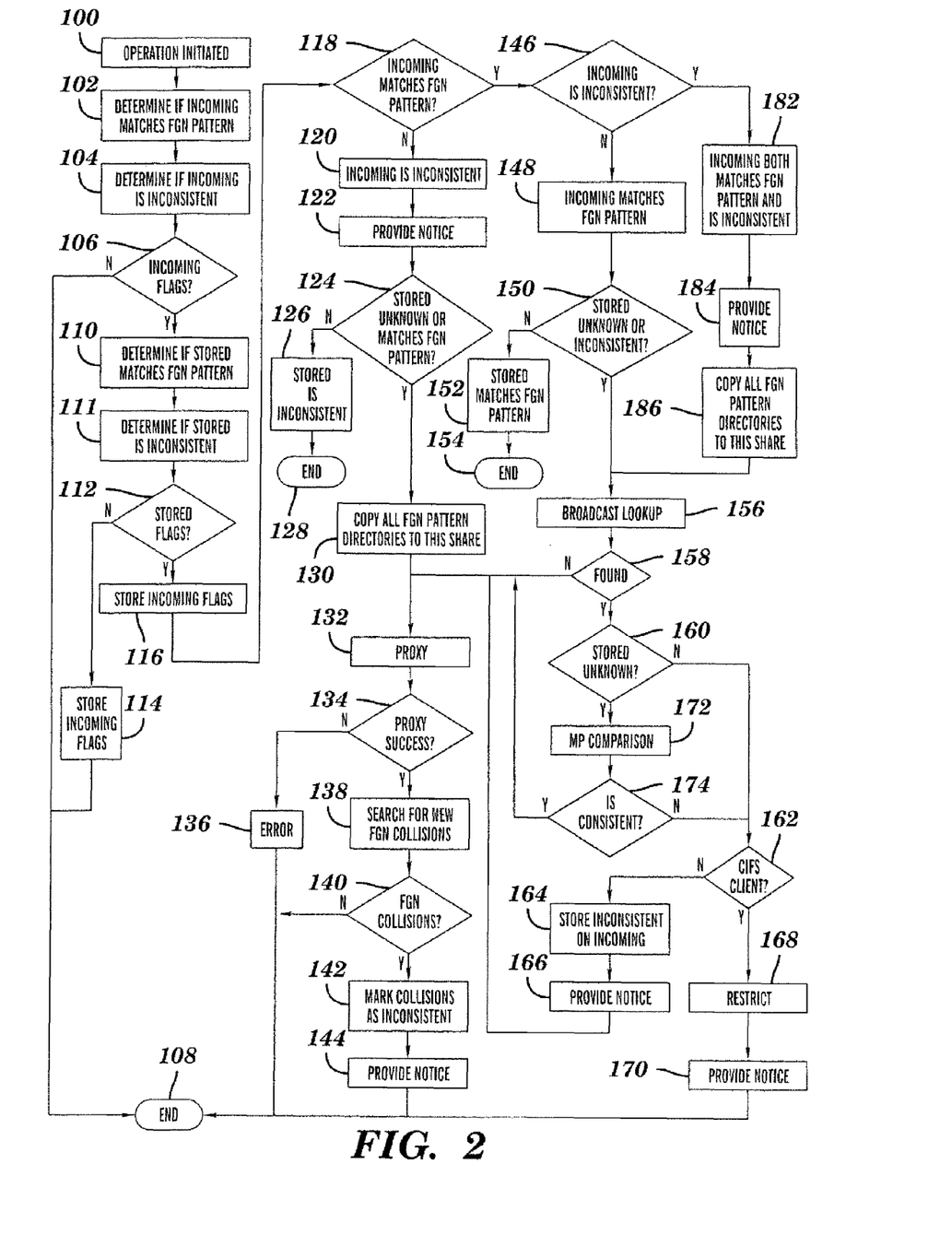
FIG. 2 is a flow chart of a method for handling a multi-protocol content name in a virtualization environment.

An exemplary method for handling a multi-protocol content name in a virtualization environment will now be described with reference to FIGS. 1 and 2. In step 100, one of the client computing devices 14(1)-14(n) initiates an operation relating to incoming content with an original content name with one or more of the data storage systems 16(1)-16(n) through the virtualization management computing device 12, although other types and numbers of devices and systems using other protocols and performing other operations can be used.

In step 102, the virtualization management computing device 12 determines whether an original content name for incoming content matches a generated name pattern used by the virtualization management computing device 12 for the one or more data storage systems 16(1)-16(n), although other types and numbers of determinations for potential collisions could be used. By way of example only, if the original content name was ACOPIA~1 and the generated name pattern used by the virtualization management computing device 12 inserts a tilde symbol (~1) when one or more of the protocols is unable to represent the original content name, then a match is determined.

In step 104, the virtualization management computing device 12 determines whether an original content name for incoming content is not representable in one or more of the protocols used by virtualization management computing device 12. By way of example only, if the original content name, "Acopia" for the incoming content only differs from a stored content name. "acopia" by capitalization, then only systems and devices utilizing NFS can distinguish and separately identify this incoming content from the stored content. Systems and devices utilizing the CIFS protocol could not distinguish and separately identify this incoming content from the stored content.

If in steps 102 and 104, the virtualization management computing device 12 determined that the original content name does not match the generated name pattern used by the virtualization management computing device 12 and that the original content name is representable in all protocols then in step 106 the No branch is taken to step 108, where this method ends. If in step 102 the virtualization management computing device 12 determines the original content name matches the generated name pattern used by the virtualization management computing device 12, then in step 106 the Yes branch is taken to step 110. Likewise, if in step 104 the virtualization management computing device 12 determines the original content name is not representable in any of the protocols used by the virtualization management computing device 12, then the Yes branch is taken to step 110.

In step 110, virtualization management computing device 12 consults metadata filer system 18 to determine whether any stored content names in the same directory as the incoming content name match the generated name pattern used by the virtualization management computing device 12 for the one or more data storage systems 16(1)-16(n). The result may be yes, no, or unknown.

In step 111, virtualization management computing 12 queries metadata filer system 18 to determine whether any other stored content names in the same directory as the incoming content name are not representable in one or more of the protocols used by virtualization management computing device 12. The result may be yes, no, or unknown.

If in steps 110 and 111, the virtualization management computing device 12 determined that there are no stored content names in the same directory as the incoming content name that match the generated name pattern used by virtualization management computing device 12 and that there are no stored content names in the same directory as the incoming content name that are not representable in all protocols, then the in step 112 the No branch is taken to step 114. If in step 112 the No branch is determined not to be appropriate by the virtualization management computing device 12, then the Yes branch is taken to step 116.

In step 114, the information regarding the incoming content name determined in steps 102 and 104 is recorded in metadata filer system 18. It is now available to inform future operations. This method proceeds to step 108, where it ends.

In step 116, the information regarding the incoming content name determined in steps 102 and 104 is recorded in metadata filer system 18. It is now available to inform future operations. This method proceeds to step 118.

In step 118, the result of step 102 is used. If the virtualization management computing device 12 determined in step 102 whether the original content name for incoming content matches a generated name pattern used by the virtualization management computing device 12 for the one or more data storage systems 16(1)-16(n), the Yes branch is taken to step 146. If the incoming content name does not match the generated name pattern, then in step 118 the No branch is taken to step 120.

In step 120, the virtualization management computing device 12 notes that, as logically follows from earlier steps, the original name for incoming content is not representable in one or more of the protocols used by virtualization management computing device 12. Next, this method proceeds to step 122.

In step 122, the virtualization management computing device 12 provides notification by email to one of the client computing devices 14(1)-14(n) which is acting as an administrator of the restricted access to the content, although other manners of providing notification to other types and numbers of systems can be used. By way of example only, other manners of providing notification which could be used in this and the other notification step described herein include logging to a system log file, displaying notifications to client or graphical user interfaces, sending data via SNMP or other network protocols or building datasets containing the information via application programming interfaces (API) for administrative notification. Next, this method proceeds to step 124.

In step 124, the result of step 110 is used. If in step 110, the virtualization management computing device 12 determines there are no stored content names in the same directory as the incoming content name that match the generated name pattern used by the virtualization management computing device 12, then in step 124 the No branch is taken to step 126. If in step 124 the No branch is determined not to be appropriate by the virtualization management computing device 12, then in step 124 the Yes branch is taken to step 130.

In step 126, the virtualization management computing device 12 records on metadata filer system 18 that the original name for incoming content is not representable in some protocols. This name does not cause a collision because there are no other stored names for original content in the same directory that match the generated name pattern used by virtualization management computing device 12. Next, this method proceeds to step 128 where it ends.

In step 130, the virtualization management computing device 12 has predicted that a collision may occur, as there exist stored names for original content that match the generated name pattern in the same directory as the incoming name, and the incoming name is not representable in one or more supported protocols. The virtualization management computing device 12 attempts to prevent the impending collision from affecting access to directories contained within the directory for the incoming name. It copies all sub-directory names within the incoming name's directory that match the generated name pattern to all data storage systems 16(1)-16(n). Thus, the names are allocated by virtualization management computing device 12, and cannot be chosen later by data storage systems 16(1)-16(n). Next, this method proceeds to step 132.

In step 132, the virtualization management computing device 12 sends (proxies) the original incoming operation initiated by the user to one or more data storage systems 16(1)-16(n). As identified earlier, the name created will not be accessible to one or more protocols supported by the virtualization management computing device 12 and data storage systems 16(1)-16(n). However, the collision name(s) generated by the filer will not affect access to directories due to the action taken in step 130. If this proxy operation was not successful for any reason, this method proceeds to step 136 where an error is noted, and on to step 108 where it ends. If the proxy operation was successful, this method proceeds to step 138.

In step 138, the virtualization management computing device 12 communicates with data storage systems 16(1)-16(n) to discover the collision name generated by data storage system 16(1)-16(n) for the protocols (CIFS, NFS) that could not represent the original content name for incoming content.

In step 140 if the name is not found to collide with any existing stored content names in the same directory, then the No branch is taken to step 108 where this method ends. If in step 140 the name collides with an existing stored content name in the same directory, as obtained from metadata filer system 18, the Yes branch is taken to step 142. In step 142, this stored content name is marked as not representable by certain protocols in metadata filer system 18 and this method proceeds to step 144.

In step 144, the virtualization management computing device 12 provides notification by email to one of the client computing devices 14(1)-14(n) which is acting as an administrator of the restricted access to the content, although other manners of providing notification to other types and numbers of systems can be used as described earlier. Next, this method proceeds to step 108 where it ends.

In step 146, it has been established that the incoming name matches a generated name pattern used by the virtualization management computing device 12 for the one or more data storage systems 16(1)-16(n). If the incoming content name is, in addition, representable by all protocols supported by virtualization management computing device 12 for the data storage systems 16(1)-16(n), then in step 146 the No branch is taken to step 148. If the incoming content name is not representable in one or more protocols, then in step 146 the Yes branch is taken to step 182.

In step 148, the virtualization management computing device 12 notes that, as logically follows from earlier steps, the original name for incoming content matches a generated name pattern used by the virtualization management computing device 12 for one or more data storage systems 16(1)-16(n). Next, this method proceeds to step 150.

In step 150, the result of step 110 is used. If in step 110, the virtualization management computing device 12 determines that all stored content names in the same directory as the incoming content name can be represented in all protocols used by the virtualization management computing device 12, then in step 150 the No branch is taken to step 152. If in step 150 the No branch is determined not to be appropriate by the virtualization management computing device 12, then the Yes branch is taken to step 156.

In step 152, the virtualization management computing device 12 records on metadata filer system 18 that the original name for incoming content matches the generated name pattern used by the virtualization management computing device 12 for one or more data storage systems 16(1)-16(n). This name does not cause a collision because all stored names for original content in the same directory are representable in all protocols supported by the virtualization management computing device 12. Next, this method proceeds to step 154 where it ends.

In step 156, the virtualization management computing device 12 consults the data storage systems 16(1)-16(n) to determine if the incoming name for original content already exists as a name generated by the data storage systems 16(1)-16(n). If in step 158 the virtualization management computing device 12 determines the name is found, then the Yes branch is taken to step 160 to handle the collision. If in step 158 the virtualization management computing device 12 determines the name is not found, then the No branch is taken to back to step 132.

In step 160, the results of steps 110 and 111 are used. If it is not known by consulting metadata filer system 18 whether the directory for the incoming name contains names that match the generated name pattern used by the virtualization management computing device 12 for any of the data storage systems 16(1)-16(n), or if it is not known by consulting metadata filer system 18 if the directory for the incoming name contains names that cannot be represented in all protocols supported by virtualization management computing device 12, then in step 160 the Yes branch is taken to step 172. If in step 160 the Yes branch is determined not to be appropriate by the virtualization management computing device 12, then the No branch is taken to step 162.

In step 162, if the operation initiated in step 100 is from one of the client computing devices 14(1)-14(n) or client computing devices 15(1)-15(n) that is using the protocol for which a name has been generated by the data storage systems 16(1)-16(n) discovered in step 156, the operation must be restricted. The incoming name for original content in the client computing device's protocol conflicts with a name generated by the data storage systems 16(1)-16(n) for stored content in the client computing device's protocol. In step 168 this restriction is executed by the virtualization management computing device 12.

In step 164, the virtualization management computing device 12 records on metadata filer system 18 that the original name for incoming content is not accessible to some protocols. Next, this method proceeds to step 166.

In step 166, the virtualization management computing device 12 provides notification by email to one of the client computing devices 14(1)-14(n) which is acting as an administrator of the restricted access to the content, although other manners of providing notification to other types and numbers of systems can be used as described earlier. Next, this method proceeds back to step 132.

As described earlier, in step 168 the virtualization management computing device 12 restricts the operation initiated in step 100, as it cannot be correctly performed on data storage systems 16(1)-16(n).

In step 170, the virtualization management computing device 12 provides notification by email to one of the client computing devices 14(1)-14(n) which is acting as an administrator of the restricted access to the content, although other manners of providing notification to other types and numbers of systems can be used as described earlier. Next, this method proceeds back to step 108, where this method ends.

Back in step 172, the virtualization management computing device 12 queries the incoming name for original content on data storage systems 16(1)-16(n) to determine if it is accessible to all protocols. The method used is dependent on the protocols, however by way of example, the method is given for NFS and CIFS protocols. First, retrieve the size of the filesystem object associated with the incoming name using both protocols. If the size of the object is different, then the names refer to different objects, and the proper one is inaccessible to CIFS; proceed to step 174. If the sizes are the same, then the virtualization management computing device 12 records the last-accessed times available using CIFS and NFS. It uses the NFS protocol to change the last-accessed time of the incoming name to the current, wall-clock time. It then retrieves the last-accessed time of the object using both protocols. If the times match, then the filesystem objects are the same. Allowance must be made for differences in daylight savings time handling between the two protocols. If the times differ, the incoming names refer to different filesystem objects, and the proper one is inaccessible to CIFS clients.

In step 174, if the comparison from step 172 discovered that the incoming name for original content is accessible to all protocols supported by virtualization management computing device 12, then the Yes branch back to step 132. If the incoming name is not accessible to all protocols, then the No branch is taken back to step 162.

In step 182, the virtualization management computing device 12 notes that, as logically follows from earlier steps, the original name for incoming content matches a generated name pattern used by the virtualization management computing device 12 for the one or more data storage systems 16(1)-16(n) and the original name for incoming content is not representable in one or more of the protocols used by virtualization management computing device 12. Next, this method proceeds to step 184.

In step 184, the virtualization management computing device 12 provides notification by email to one of the client computing devices 14(1)-14(n) which is acting as an administrator of the restricted access to the content, although other manners of providing notification to other types and numbers of systems can be used as described earlier. Next, this method proceeds to step 186.

In step 186, the virtualization management computing device 12 has predicted that a collision may occur, as there exist stored names for original content that match the generated name pattern in the same directory as the incoming name, and the incoming name is not representable in one or more supported protocols. The virtualization management computing device 12 attempts to prevent the impending collision from affecting access to directories contained within the directory for the incoming name. It copies all sub-directory names within the incoming name's directory to all data storage systems 16(1)-16(n). Thus, the names are allocated by virtualization management computing device 12, and cannot be chosen later by data storage systems 16(1)-16(n). Next, this method proceeds back to step 156.

Accordingly, as illustrated and described herein the present invention provides a more effective method and system for handling a multi-protocol content name in a virtualization environment. With the present invention, potential collisions between similar content names in different shares can be identified and remedial action can be taken. The present invention helps to avoid the accidental overwrite or other loss of content, such as a file or a directory, in a virtualization environment.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for handling a multi-protocol name in a virtualization environment, the method comprising:

determining with a virtualization management computing device when a name collision occurs between content names of different content accessible by two or more protocols, the determining further comprises determining when an original content name for incoming content matches a generated name pattern used by the virtualization management computing device and determining when a name collision occurs between the original content name and a stored content name for stored content in one or more network attached storage devices accessible via the two or more protocols when a match is determined between the original content name and the generated name pattern; and restricting with the virtualization management computing device all access to the different content in the one or more network attached storage devices when the name collision is determined to occur to one or more of the protocols which can distinguish the different content, the restricting restricts access to the incoming content with the original content name and the stored content when the name collision is determined to occur to one or more of the protocols which can distinguish different files.

2. The method as set forth in claim 1 wherein the determining further comprises determining with the virtualization management computing device when the name collision occurs between a generated content name for incoming content and a stored content name for stored content in one or more of the network attached storage devices accessible to the two or more protocols;

wherein the restricting restricts access to the incoming content with the generated content name and the stored content when the name collision is determined to occur to one or more of the protocols which can distinguish the different files.

3. The method as set forth in claim 2 further comprising:

determining with the virtualization management computing device when one or more of the protocols is unable to represent an original content name for incoming content; and generating with the virtualization management computing device the generated content name for the incoming content.

4. The method as set forth in claim 1 further comprising providing with the virtualization management computing device notification of the determined name collision.

5. The method as set forth in claim 1 wherein the two or more protocols comprise NFS and CIFS.

6. A non-transitory computer readable medium having stored thereon instructions for methods for handling a multi-protocol content name in a virtualization environment comprising machine executable code which when executed by at least one processor, causes the processor to perform steps comprising:

determining when a name collision occurs between content names of different content accessible by two or more protocols, the determining further comprises determining when an original content name for incoming content matches a generated name pattern used by the virtualization management computing device and determining when a name collision occurs between the original content name and a stored content name for stored content accessible via the two or more protocols when a match is determined between the original content name and the generated name pattern; and restricting all access to the different content in one or more network attached storage devices when the name collision is determined to occur to one or more of the protocols which can distinguish the different content, the restricting restricts access to the incoming content with the original content name and the stored content when the name collision is determined to occur to one or more of the protocols which can distinguish different files.

7. The medium as set forth in claim 6 wherein the determining further comprises determining when the name collision occurs between a generated content name for incoming content and the stored content name for the stored content accessible to the two or more protocols;

wherein the restricting restricts access to the incoming content with the generated content name and the stored content when the name collision is determined to occur to one or more of the protocols which can distinguish the different files.

8. The medium as set forth in claim 7 further comprising:
determining when one or more of the protocols is unable to represent an original content name for the incoming content; and
generating the generated content name for the incoming content.

9. The medium as set forth in claim 6 further comprising providing notification of the determined name collision.

10. The medium as set forth in claim 6 wherein the two or more protocols comprise NFS and CIFS.

11. A virtualization management computing device comprising:
at least one of a configurable logic device configured to implement or one or more processors configured to execute programmed instructions stored in a memory device comprising:

determining when a name collision occurs between content names of different content accessible by two or more protocols, the determining further comprising determining when an original content name for incoming content matches a generated name pattern used by the virtualization management computing device and determining when a name collision occurs between the original content name and a stored content name for stored content in one or more of the network attached storage devices accessible via the two or more protocols when a match is determined between the original content name and the generated name pattern; and restricting all access to the different content in one or more network attached storage devices when the name collision is determined to occur to one or more of the protocols which can distinguish the different content, the restricting restricts access to the incoming content with the original content name and the stored content when the name collision is determined to occur to one or more of the protocols which can distinguish different files.

12. The device as set forth in claim 11 wherein, the at least one of the configurable logic device is further configured to implement or the one or more processors are further configured to execute programmed instructions stored in the memory wherein the determining further comprises:

determining when the name collision occurs between a generated content name for incoming content and a stored content name for stored content in one or more of the network attached storage devices accessible to the two or more protocols;

wherein the restricting restricts access to the incoming content with the generated content name and the stored content when the name collision is determined to occur to one or more of the protocols which can distinguish the different files.

13. The device as set forth in claim 12 wherein, the at least one of the configurable logic device is further configured to implement or the one or more processors are further configured to execute programmed instructions stored in the memory further comprising:

determining with the virtualization management computing device when one or more of the protocols is unable to represent an original content name for the incoming content;
and
generating with the virtualization management computing device a generated content name for the incoming content.

14. The device as set forth in claim 11 wherein the at least one of the configurable logic device is further configured to implement or the one or more processors are further configured to execute programmed instructions stored in the memory further comprising providing notification of the determined name collision.

15. The device as set forth in claim 11 wherein the two or more protocols comprise NFS and CIFS.

* * * * *